United States Patent
Murayama et al.

(10) Patent No.: US 8,278,877 B2
(45) Date of Patent: Oct. 2, 2012

(54) BATTERY PACK INCLUDING A SHOCK ABSORBING DEVICE

(75) Inventors: Tsuyoshi Murayama, Anjo (JP); Hideyuki Taga, Anjo (JP); Kazutoshi Ogino, Anjo (JP); Hidekazu Hayashi, Anjo (JP); Hitoshi Suzuki, Anjo (JP)

(73) Assignee: Makita Corporation, Anjo-Shi (JP)

( * ) Notice: Subject to any disclaimer, the term of this patent is extended or adjusted under 35 U.S.C. 154(b) by 367 days.

(21) Appl. No.: 12/654,212

(22) Filed: Dec. 14, 2009

(65) Prior Publication Data
US 2010/0156350 A1   Jun. 24, 2010

(30) Foreign Application Priority Data
Dec. 19, 2008 (JP) .................. 2008-323654

(51) Int. Cl.
*H01M 10/46* (2006.01)
(52) U.S. Cl. ........................................ 320/112
(58) Field of Classification Search ......... 320/107, 320/112, 114, 116; 429/96, 97, 98, 99, 100
See application file for complete search history.

(56) References Cited

U.S. PATENT DOCUMENTS

| | | | |
|---|---|---|---|
| 1,486,434 A | 3/1924 | Holden | |
| 4,008,356 A | 2/1977 | Asano | |
| 5,977,746 A * | 11/1999 | Hershberger et al. | 320/112 |
| 2007/0244471 A1* | 10/2007 | Malackowski | 320/107 |
| 2008/0169788 A1* | 7/2008 | Bobbin et al. | 320/135 |

FOREIGN PATENT DOCUMENTS

| | | |
|---|---|---|
| GB | 2 354 634 A | 3/2001 |
| JP | A-2000-188091 | 7/2000 |

OTHER PUBLICATIONS

Partial European Search Report issued in European Patent Application No. 09015578.9 dated May 3, 2011.

* cited by examiner

*Primary Examiner* — Edward Tso
(74) *Attorney, Agent, or Firm* — Oliff & Berridge, PLC

(57) ABSTRACT

One aspect according to the present invention includes a battery pack and a shock absorbing device interposed between a battery cell holder and a case body and capable of keeping the battery cell holder and the battery cells not to directly contact with an inner surface of the case body.

13 Claims, 14 Drawing Sheets

BATTERY PACK INCLUDING A SHOCK ABSORBING DEVICE

This application claims priority to Japanese patent application serial number 2008-323654, the contents of which are incorporated herein by reference.

BACKGROUND OF THE INVENTION

1. Field of the Invention

The present invention relates to battery packs, and in particular to battery packs for power tools including a battery cell holder for holding a plurality of battery cells, discharge terminals for connecting the battery cells to the power tools or charge terminals for connecting to a battery charger, and a controller for monitoring a charge condition or a discharge condition of the battery cells based on signals from the battery cells.

2. Description of the Related Art

Japanese Laid-Open Patent Publication No. 2000-188091 discloses a known battery pack having a battery cell holder and a case body. The battery cell holder holds a plurality of vertically oriented battery cells and is received within the case body together with the battery cells.

According to the known battery pack, at least part of the battery cell holder contacts with an inner wall of the case body. Therefore, for example, in the case that an impact force is applied to the case body from the outer side, the impact force may be applied to the internally disposed battery cells and the battery cell holder without being sufficiently absorbed. As a result, there is a possibility of causing damage on the battery cells and improper contact of terminals associated with the battery cells.

Therefore, there is a need in the art for a battery pack for a power tool, which can attenuate or absorb potential impacts or shocks that may be applied to a battery pack and a battery cell holder disposed within a case body.

SUMMARY OF THE INVENTION

One aspect according to the present invention includes a battery pack and a shock absorbing device or a damping device interposed between a battery cell holder and a case body and capable of keeping the battery cell holder and the battery cells not to directly contact with an inner surface of the case body.

DETAILED DESCRIPTION OF THE INVENTION

Figure 1:
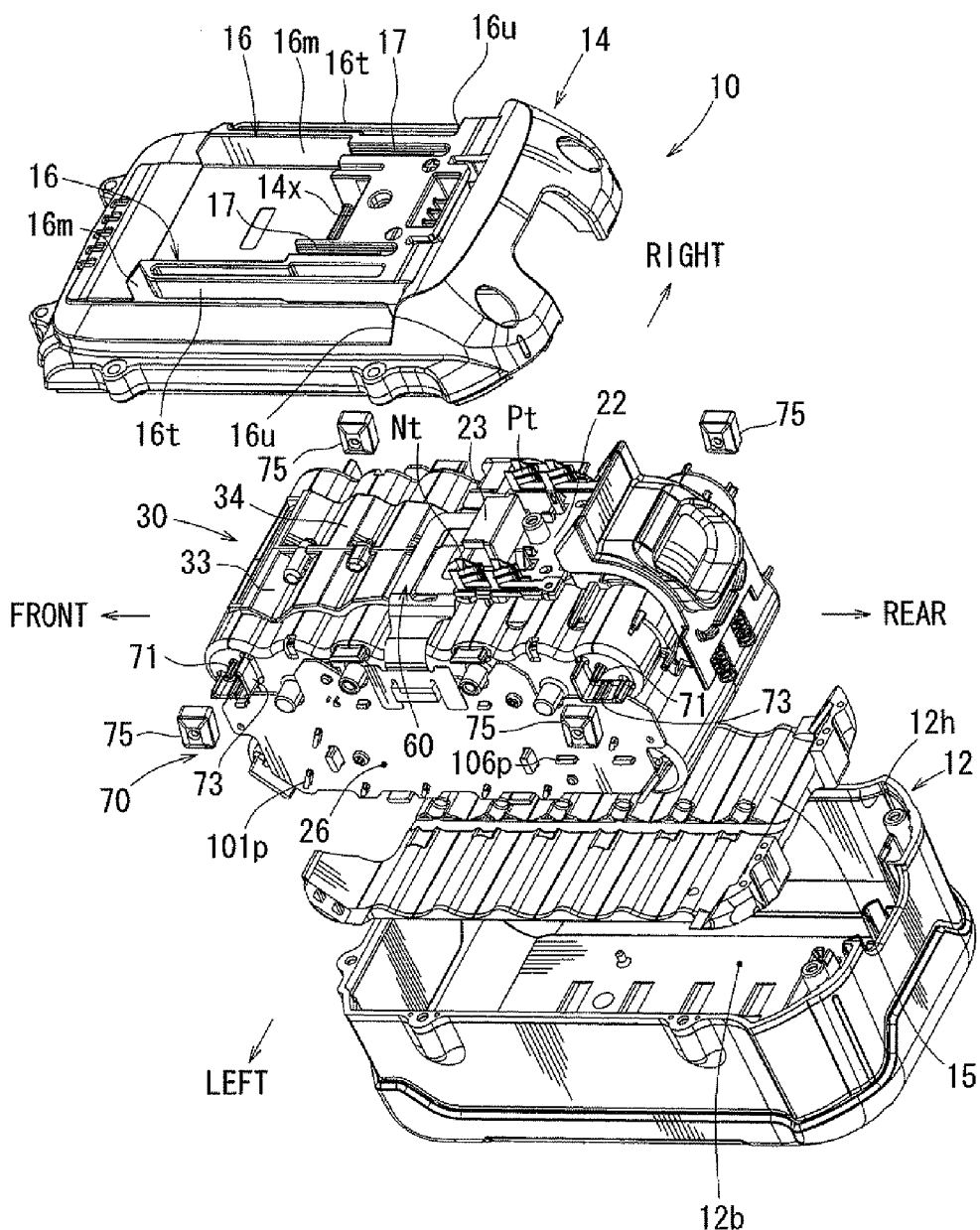
FIG. 1 is an exploded perspective view of a battery pack according to an embodiment of the present invention and showing a cover removed from a case body of the battery pack.

Each of the additional features and teachings disclosed above and below may be utilized separately or in conjunction with other features and teachings to provide improved battery packs for power tools. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a battery pack includes a case body, a battery cell holder configured to hold a plurality of battery cells, terminals including discharge terminals for connecting the battery cells to a power tool or charge terminals for connecting the battery cells to a battery charger, a control device capable of controlling a charge process or a discharge process of the battery cells, and a shock absorbing device (or a damping device) interposed between the battery cell holder and the case body and capable of keeping the battery cell holder and the battery cells not to directly contact with an inner surface of the case body.

With this arrangement, potential impacts or shocks applied to the case body can be effectively attenuated or absorbed by the shock absorbing device. Therefore, impacts or shocks transmitted to the battery cells and the battery cell holder can be reduced or minimized. As a result it is possible to prevent the battery cells from being damaged by the impacts or shocks and to prevent improper electrical connection of the terminals.

The shock absorbing device may include a first shock absorbing device including four shock absorbing blocks that are positioned at upper four corners of the battery cell holder, respectively. Therefore, it is possible to effectively absorb potential impacts or shocks by using a minimum volume of shock absorbing material.

The shock absorbing blocks may include bearings, into which shafts provided on the battery cell holder are fitted, respectively. This arrangement enables to reliably fix the shock absorbing blocks in position.

The shock absorbing device may further include a second shock absorbing device including a shock absorbing sheet that is laid on a bottom of the case body and is capable of supporting at least lower corners of the battery cell holder. This arrangement enables to effectively absorb impacts or shocks applied in the vertical direction.

The control device may include a left control circuit board and a right control circuit board positioned on a left side and a right side of the battery cell holder, respectively. The terminals may be provided on a terminal base plate positioned on an upper side of the battery cell holder.

The terminal base plate may be electrically connected to the terminal base plate via an electrically conductive flexible plate. This arrangement allows minimizing a necessary wiring space in comparison with the case where the terminal base plate is connected to the control circuit boards via a plurality of cables.

The flexible plate may be shaped to be able to expand and contract. This shape of the flexible plate ensures electrical connection of the flexible plate with the control circuit boards and the terminal base plate.

The terminal base plate may be movable relative to the battery cell holder.

The shock absorbing device may include a third shock absorbing device interposed between an upper surface of the battery cell holder and the terminal base plate.

The battery cell holder may be configured to receive the battery cells oriented in a horizontal direction and the battery cell holder may be separated into a first holder member and a second holder member that can be joined to each other. With this configuration of the battery cell holder, it is possible to easily position the battery cells within the battery cell holder.

Each of the first holder member and the second holder member may be configured as a case having a bottom on a first side, an opening defined by an open edge on a second side opposite to the first side, and a side wall. The open edges of the first and second holder members can contact with each other. The side wall of each of the first and second holder members is shaped to have a waveform with concave and convex portions to substantially conform to the outer circumferential configurations of the battery cells. The open edges of the first and second holder members can be joined to each other by fasteners at the concave portions of the side walls. With this arrangement, fasteners, such as screws, may not protrude outward from the side wall of the battery cell holder. Therefore, it is possible to minimize the size of the battery cell holder.

The battery pack may further include a first electrical insulation sheet and a second electrical insulation sheet. The first electrical insulation sheet has elasticity and is interposed between an inner bottom surface of the bottom of the first holder member and first end surfaces of the battery cells. The second electrical insulation sheet also has elasticity and is interposed between an inner bottom surface of the bottom of the second holder member and second end surfaces opposite to the first surfaces of the battery cells. Therefore, it is possible to reliably prevent electrical circuiting of the battery cells. In addition it is possible to prevent the battery cells from moving within the battery cell holder.

An electrical insulation paper may be attached to a surface of each of the first and second electrical insulation sheets, so that the electrical insulation ability of the electrical insulations sheets can be further improved.

A first embodiment of the present invention will now be described with reference to FIGS. 1 to 14. This embodiment relates to a battery pack that can be used for a large-size power tool and can be recharged by a battery charger, <General Construction of Battery Pack>

Referring to FIG. 1, a battery pack 10 according to this embodiment includes a case body 12 having an upper opening 12 and a cover 14 for covering the opening 12. Each of the case body 12 and the cover 14 has a substantially rectangular configuration in plan view. The cover 14 can be fixedly to the case body 12 at eight positions along the circumference by using screws (not shown). In this embodiment, the case body 12 and the cover 14 constitute a battery pack body.

Figure 9:
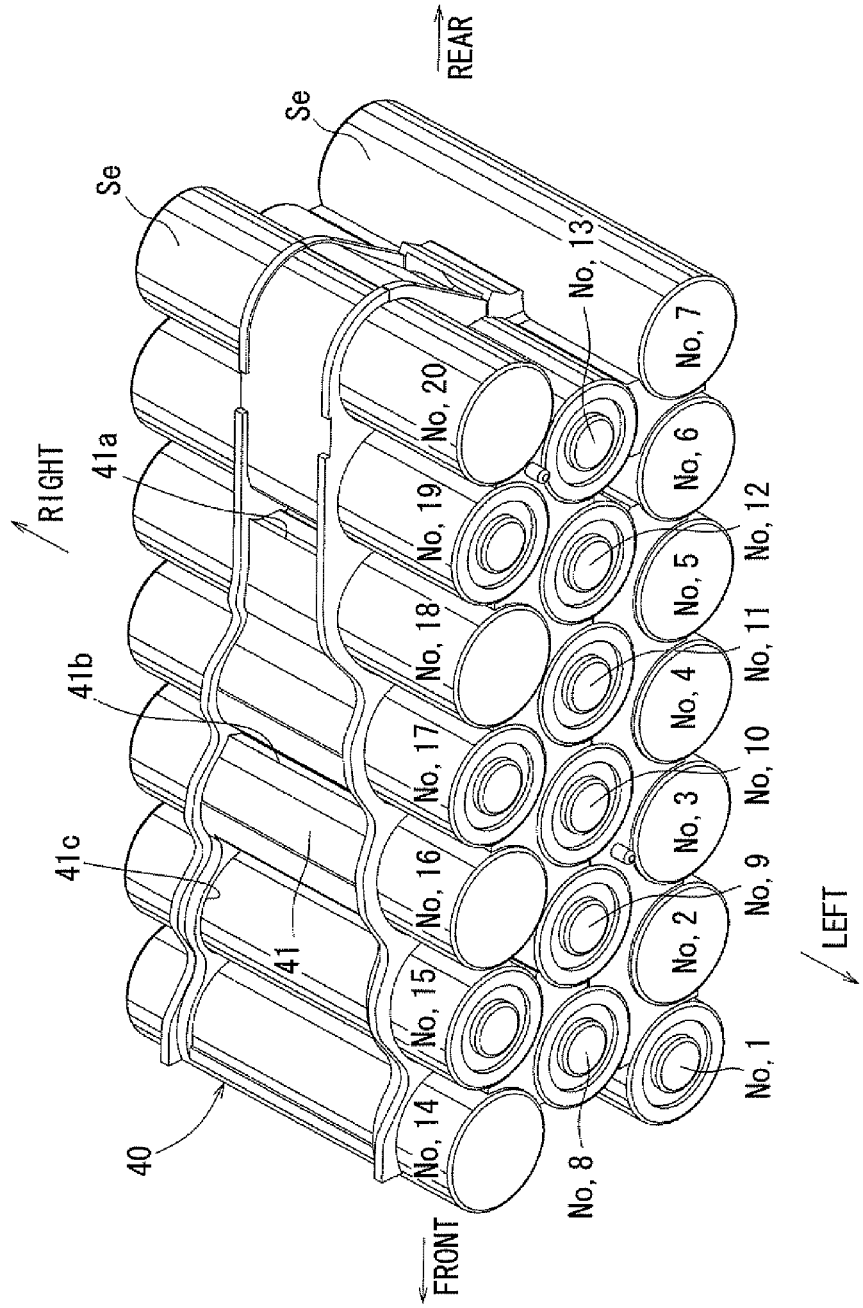
FIG. 9 is a perspective view of a bundle of the battery cells and their associated components.
Figure 10:
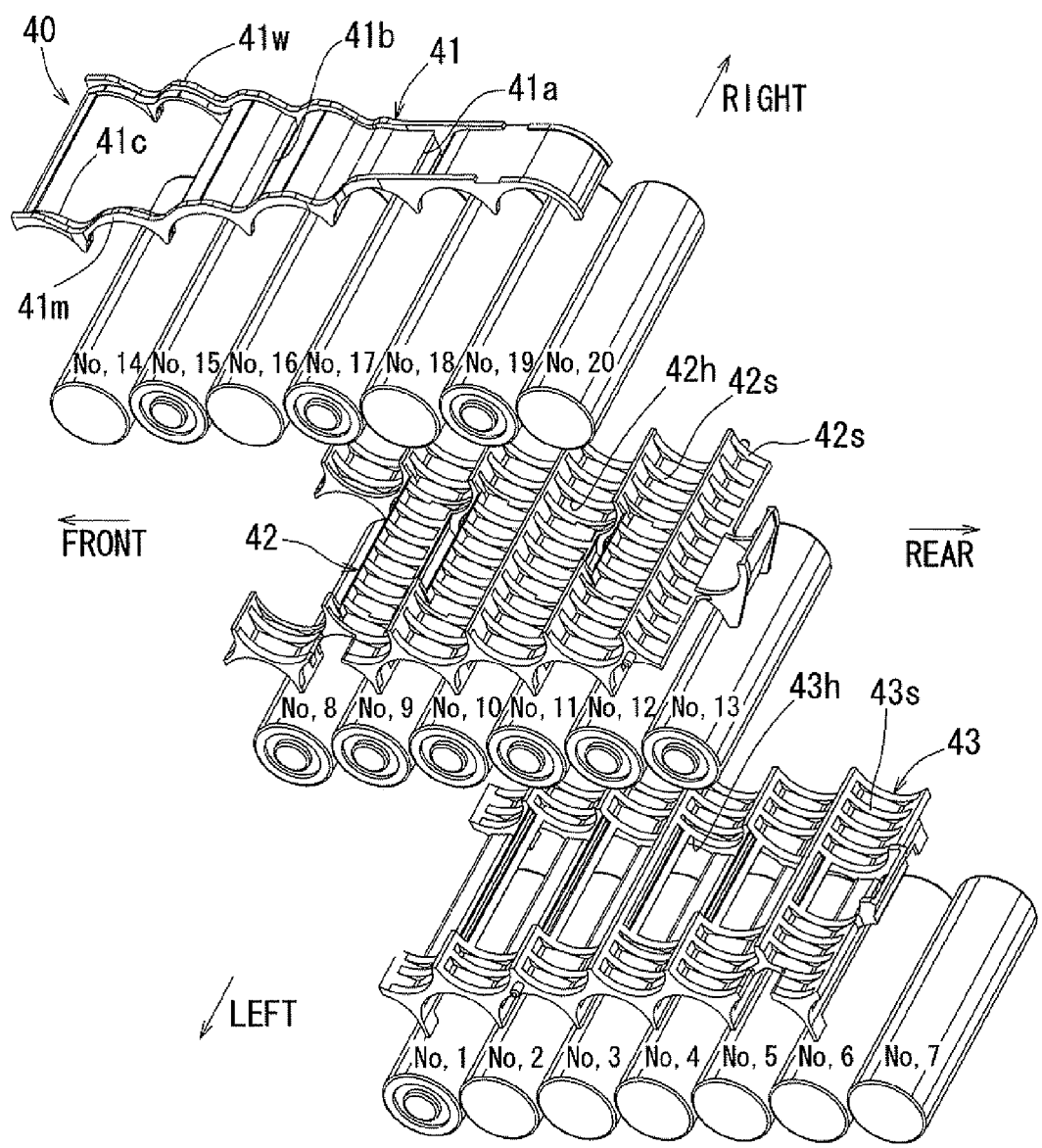
FIG. 10 is an exploded perspective view of the bundled cells and their associated components shown in FIG. 9.
Figure 11:
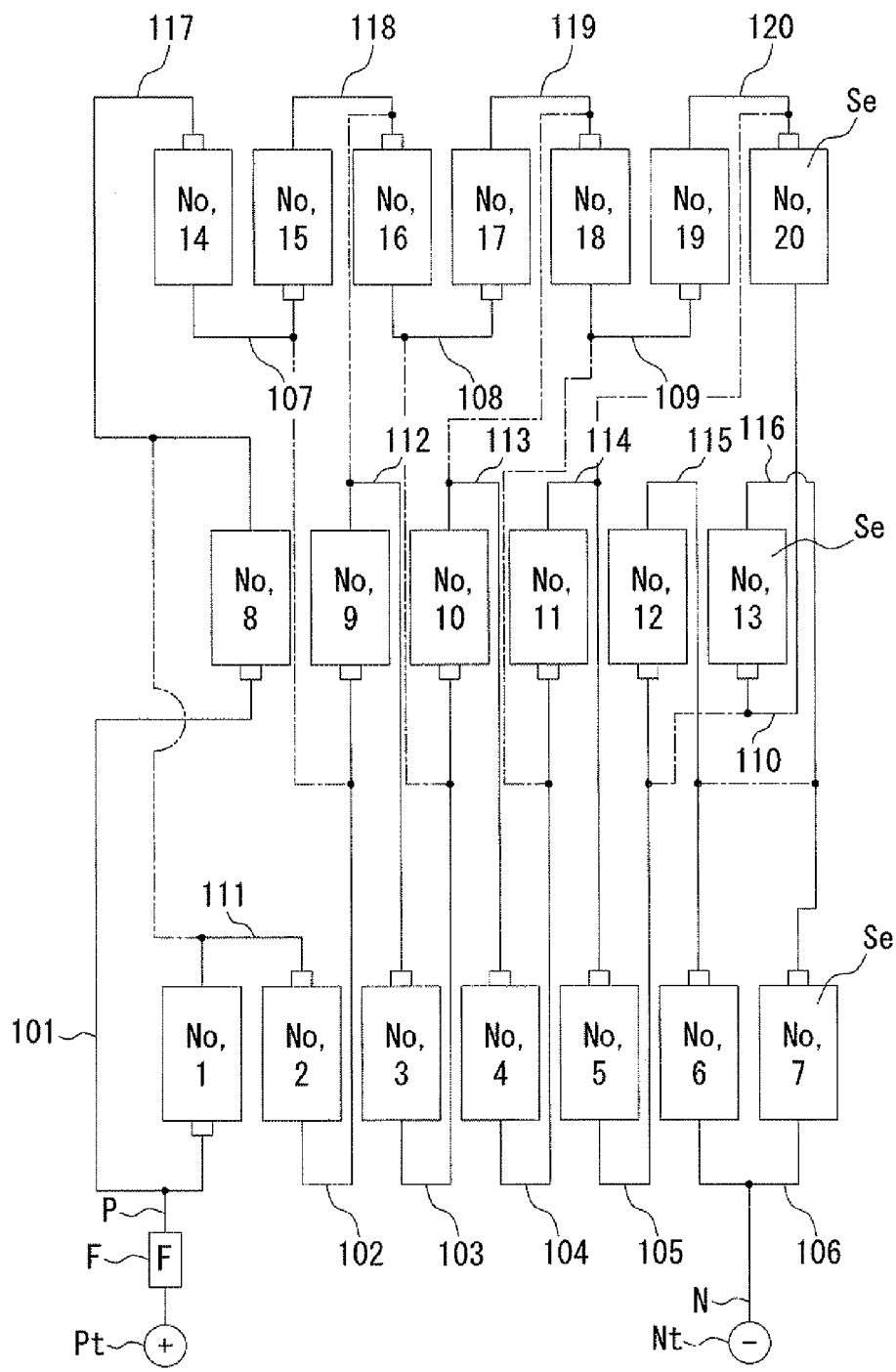
FIG. 11(A) is a diagram showing a circuit configuration for electrically connecting between the battery cells.
FIG. 11(B) is a schematic diagram of the circuit configuration shown in FIG. 11(A)
Figure 11:
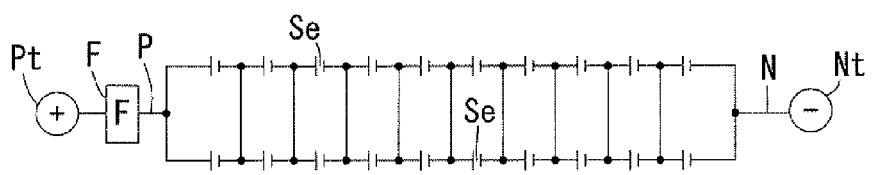
Figure 12:
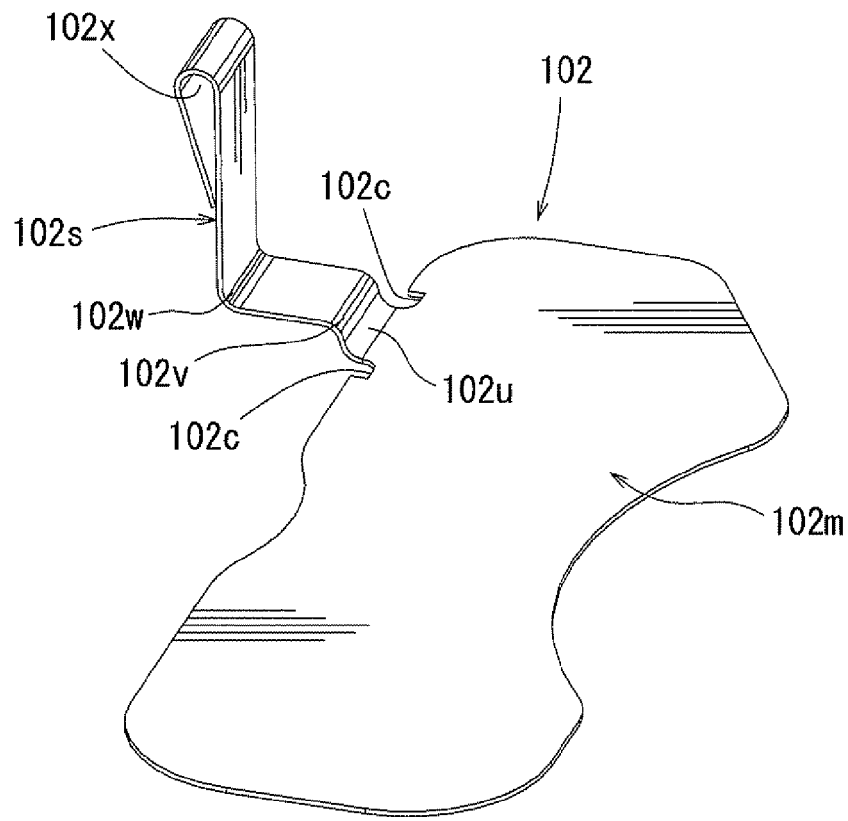
FIGS. 12(A), 12(B) and 13 are perspective views of lead plates.
Figure 12:
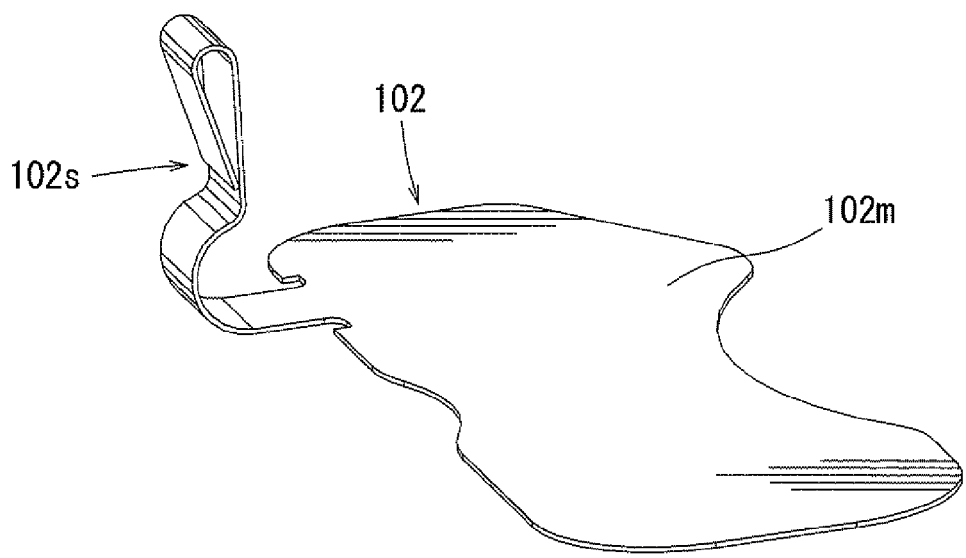

A rubber sheet 15 is laid on an inner bottom surface 12b of the case body 12. A battery cell holder 30 that holds a plurality of battery cells Se is received within the case body 12. In this embodiment, as shown in FIGS. 9 and 10, twenty cylindrical battery cells Se (No. 1 to No. 20 battery cells Se) are stacked in a three-tiered manner. As shown in FIGS. 11(A) and 11(B), each two of the twenty battery cells Se are connected parallel to each other and ten sets of the two battery cells Se connected parallel to each other are connected in series with each other. A positive side ("+" side in FIGS. 11(A) and 11(B)) of an electrically connected bundle of the twenty battery cells Se is electrically connected to a positive side charge and discharge terminal Pt via a positive side cable P and a fuse F. A negative side ("−" side in FIGS. 11(A) and 11(B)) of the bundle of the battery cells Se is electrically connected to a negative side charge and discharge terminal Nt via a negative side cable N. The positive side and negative side charge and discharge terminals Pt and Nt can be connected to positive and negative side plate-like terminals of a battery charger (not shown), respectively, and/or to positive and negative side plate-like terminals of an electric power tool (not shown).

Figure 3A:
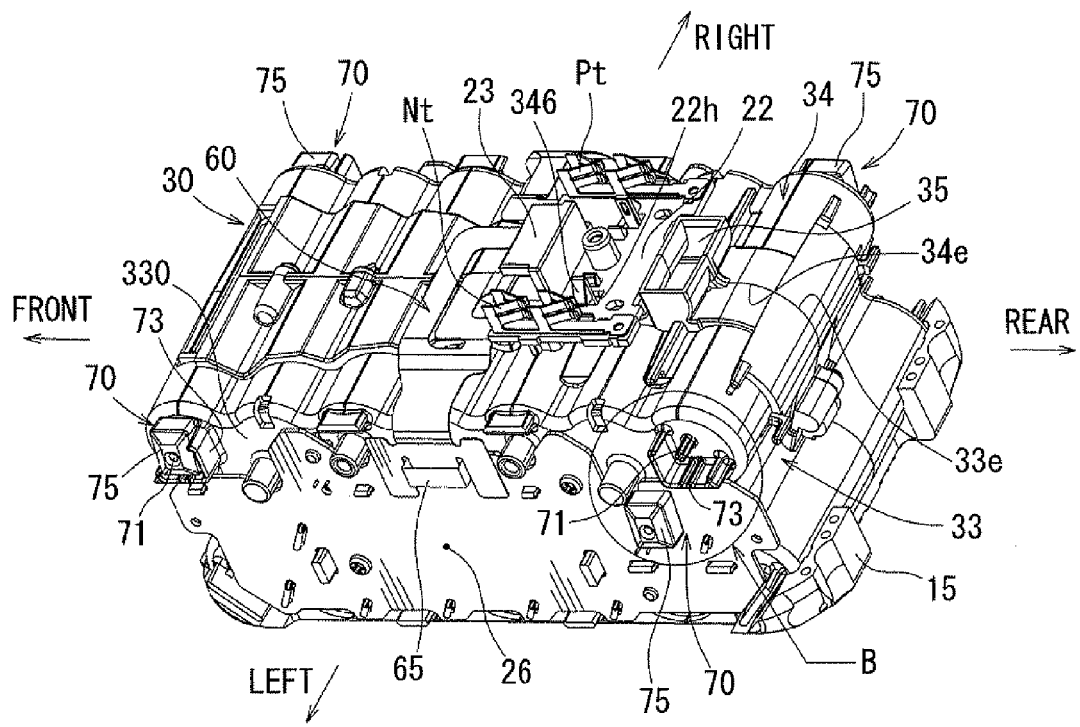
FIG. 3(A) is a perspective view of a battery cell holder of the battery pack as viewed from the rear side.
Figure 3B:
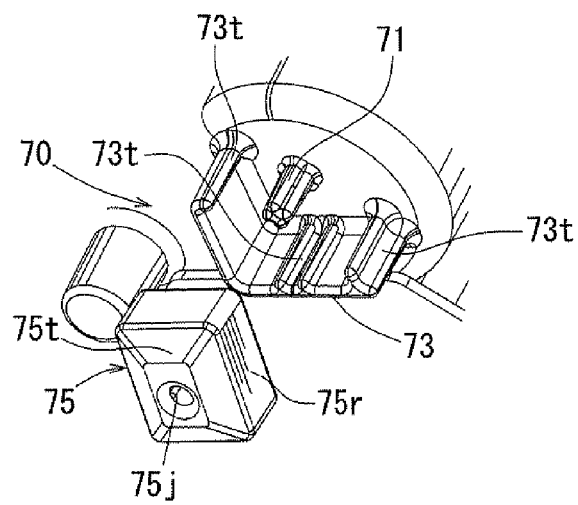
FIG. 3(B) is an enlarged view of a portion indicated by an arrow B in FIG. 3(A)
Figure 4:
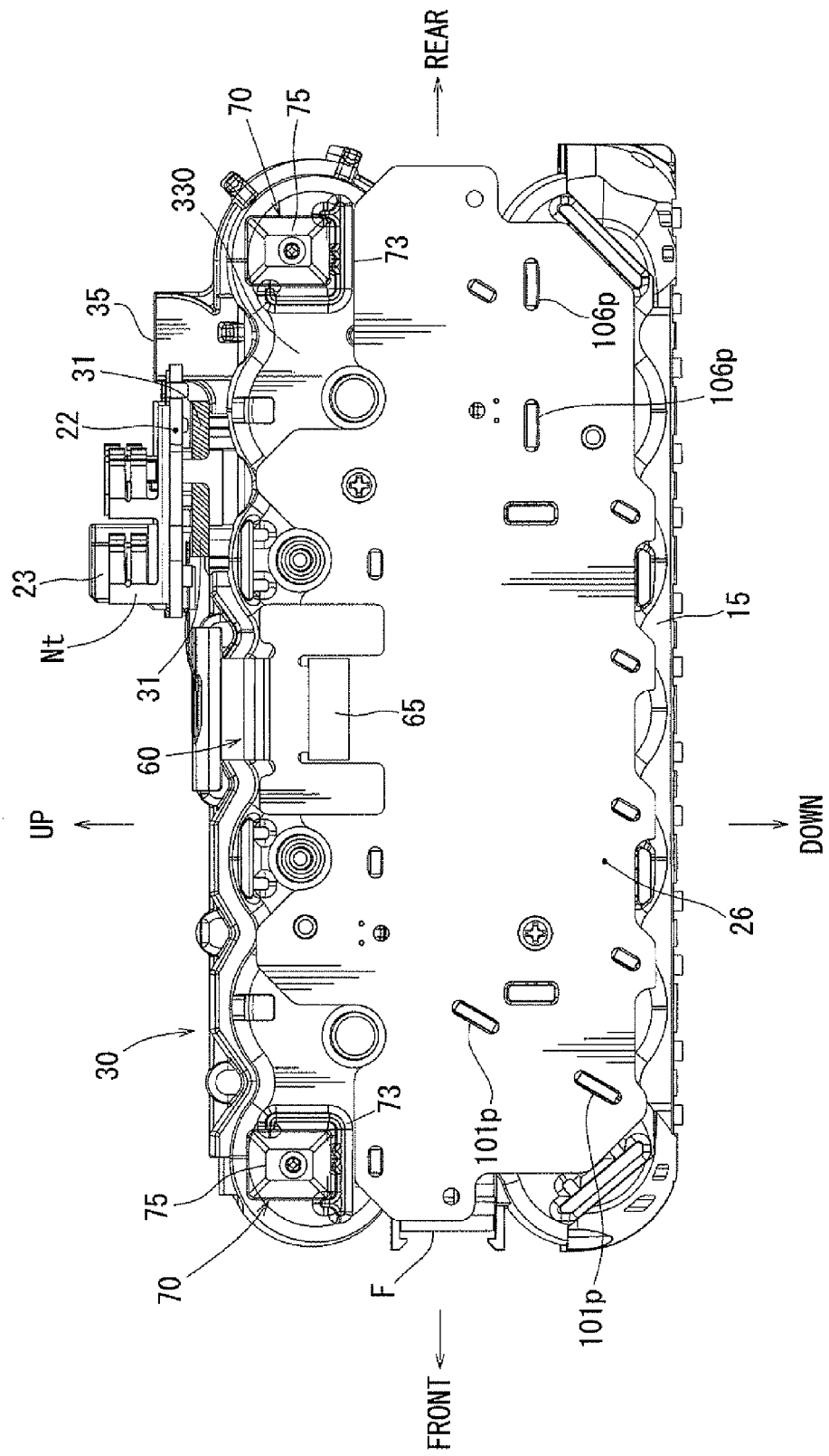
FIG. 4 is a side view of the battery cell holder.

As shown in FIGS. 1 and 3(A) and 3(B), the positive side and negative side charge and discharge terminals Pt and Nt are mounted to right and left side portions of a terminal base plate 22, respectively. The terminal base plate 22 extends horizontally on the rear portion of the upper surface of the battery cell holder 30. An output connector 23 of a control circuit for controlling a charge process and/or a discharge process of the battery cells Se is mounted to the terminal base plate 22 at a position between the positive side and negative side charge and discharge terminals Pt and Nt. The control circuit will not be described in detail, because such a control circuit for controlling a charge process and/or a discharge process of battery cells is known in the art. The output connector 23 is formed to be oriented forwardly, so that a corresponding connector of the charging device or the power tool can be connected to the output connector 23 from the front side. As shown in FIG. 4, the terminal base plate 22 is placed on the rear portion of the upper surface of the battery cell holder 30 with an intervention of a rubber plate 31 between the terminal base plate 22 and the upper surface of the battery cell holder 30, so that the terminal plate 22 can move horizontally by a suitable distance relative to the battery cell holder 30. The rubber plate 31 serves as a shock absorbing member (or a damper) as will be hereinafter described.

As shown in FIG. 1, left and right parallel slide rails 16 are formed on an upper surface of the cover 14 of the battery pack 10 and extend in forward and rearward directions. Each of the slide rails 16 includes a rail body 16m and a linear projection 16t extending outwardly in a widthwise direction by a predetermined distance from an upper surface of the rail body 16m. A stopper portion 16u is formed on the rear end portion of the rail body 16m.

A connecting portion (not shown) provided on the charging device or the power tool can be fitted to the left and right slide rails 16 of the cover 14 from the front side and can then slide rearwardly along the slide rails 16 (while maintaining the fitting state with the slide rails 16) until the connecting portion abuts to the stopper portions 16u.

On the inner side with respect to the widthwise direction of the left and right slide rails 16, left and right guide slits 17 are formed in the upper surface of the cover 14 for guiding the plate-like terminals of the charging device or the power tool to the positive side and negative side charge and discharge terminals Pt and Nt, respectively. In addition, an opening 14x is formed in the upper surface of the cover 14 at a position between the left and right guide slits 17 for exposing the output connector 23 of the control circuit to the out side.

With this construction, the connecting portion of the charging device or the power tool can be fitted to the slide rails 16 of the cover 14 from the front side and can be slid rearwardly until abutting to the stopper portions 16u, so that the plate-like terminals of the charging device or the power tool can be electrically connected to the charge and discharge terminals Pt and Nt of the battery pack 10, respectively, and the connector of the charging device or the power tool can also be electrically connected to the output connector 23 of the battery pack 10.

<Battery Cell Holder>

Figure 6:
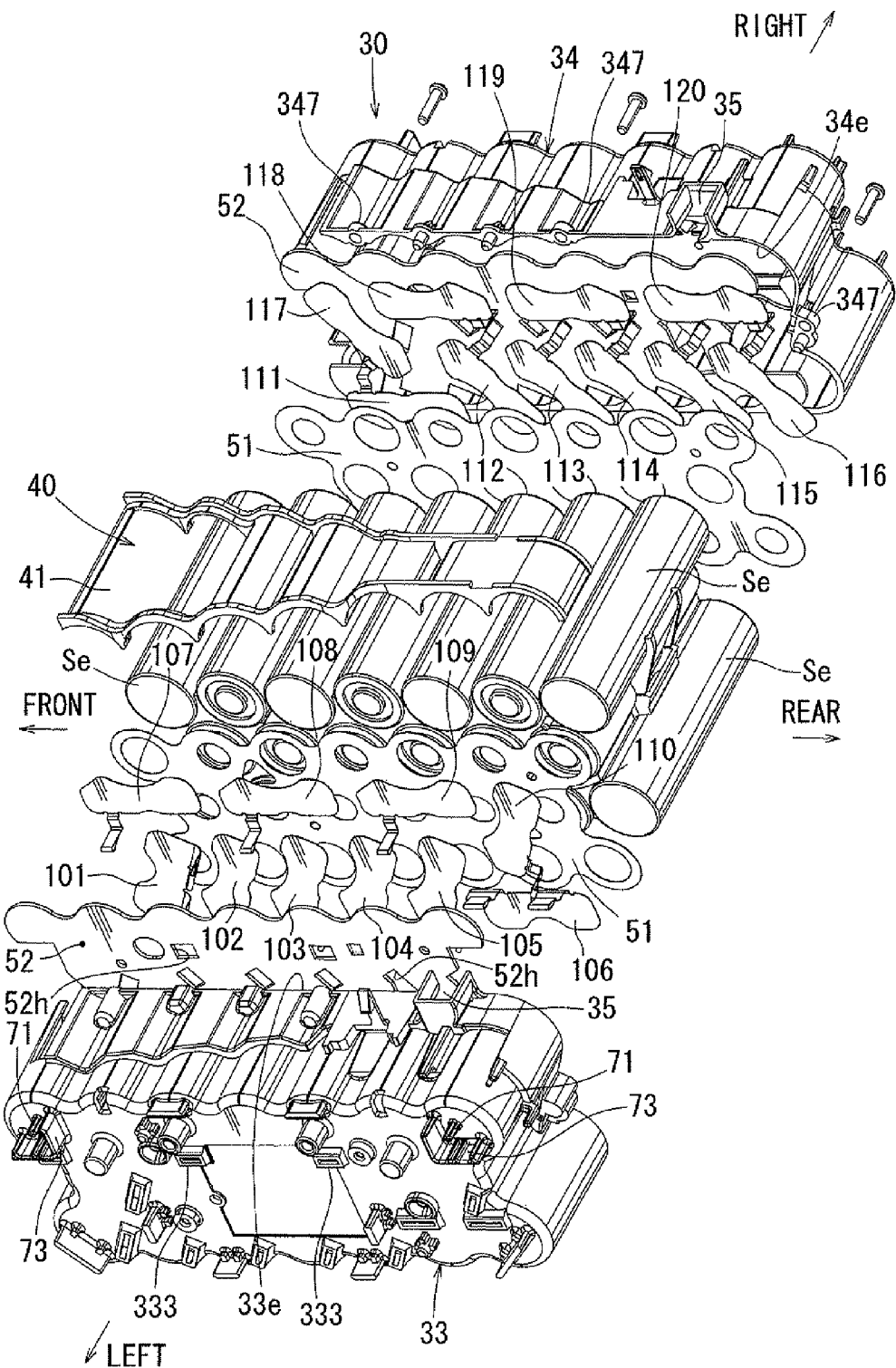
FIG. 6 is an exploded perspective view of the battery cell holder.

As shown in FIG. 6, the battery cell holder 30 includes a flow control plate 40, left and right electrical insulation plates 51, a plurality of electrically conductive lead plates 101 to 120, left and right electrical insulation sheets 52 and left and right holder members 33 and 34. The flow control plate 40 can hold the bundle of the horizontally oriented battery cells Se in a three-tiered manner and can produce a substantially uniform flow of air around the bundle of the battery cells Se. The left insulation plate 51 can cover the circumferences of the electrodes exposed at the left end surfaces of the battery cells Se. Similarly, the right insulation plate 51 can cover the circumferences of electrodes exposed at the right end surfaces of the battery cells Se. The lead plates 101 to 120 are made of electrically conductive material and can electrically connect the battery cells Se in a manner as described above at their left and right end sides. The left insulation sheet 52 covers the left end surfaces of the battery cells Se from the outer side of the corresponding lead plates 101 to 110. Similarly, the right insulation sheet 52 covers the right end surfaces of the battery cells Se from the outer side of the corresponding lead plates 111 to 120. The left holder member 33 and the right holder member 34 cover the left side half and the right side half of the bundle of the battery cells Se, respectively.

<Flow Plate>

As shown in FIGS. 9 and 10, the flow plate 40 includes a first plate portion 41, a second plate portion 42 and a third plate portion 43. The first plate portion 41 covers the upper side of No. 14 to No. 20 battery cells Se positioned at the top stage of the battery cell bundle. The second plate portion 42 is interleaved between No. 14 to No. 20 battery cells Se and No. 8 to No. 13 battery cells Se positioned at the middle stage of the battery cell bundle. The third plate portion 43 is interleaved between No. 8 to No. 13 battery cells Se positioned at the middle stage and No. 1 to No. 7 battery cells Se positioned at the bottom stage. The upper surfaces of the rear portions of the left and right holder members 33 and 34 include portions that jointly form an air inlet 35 (see FIG. 6). The first plate portion 41 serves to facilitate the air entering air inlet 35 to flow forwardly. More specifically, the first plate portion 41 has a width that gradually increases in the front side direction and has a waveform to extend along upper portions of the outer circumferential surfaces of No. 14 to No. 20 battery cells Se positioned at the top stage. As shown in FIG. 10, left and right guide walls 41w are formed on the left and right edge portions of the first plate portion 41, respectively, in order to guide the flow of air in the front and rear side directions. Slots 41a, 41b and 41c are formed in the first plate portion 41 to extend therethrough at suitable positions in the front and rear side directions in order to allow the air to flow downward through the slots 41a, 41b and 41c.

The second plate portion 42 has a rectangular configuration as viewed in plan view and has a waveform to extend along lower portions of the outer circumferences of No. 14 to No. 20 battery cells Se and upper portions of the outer circumferences of No. 8 to No. 13 battery cells Se. The third plate portion 43 also has a rectangular configuration as viewed in plan view and has a waveform to extend along lower portions of the outer circumferences of No. 8 to No. 13 battery cells Se and upper portions of the outer circumferences of No. 1 to No. 7 battery cells Se. The second plate portion 42 has a plurality of slots 42h and a plurality of separators 42s. The slots 42h extend through the second plate portion 42 for allowing the air to flow therethrough in the vertical direction. The separators 42s serve to guide the flow of air in the front side and rear side directions. Similarly, the third plate portion 43 has a plurality of slots 43h and a plurality of separators 43s. The slots 43h extend through the third plate portion 43 for allowing the air to flow therethrough in the vertical direction. The separators 43s serve to guide the flow of air in the front side and rear side directions.

<Lead Plates>

As shown in FIG. 11(A), the lead plates 101 to 120 are classified into eighteen intermediate lead plates (lead plates 102 to 105 and 107 to 120) electrically connecting the twenty battery cells Se to each other, one positive side lead plate (lead plate 101) and one negative side lead plate (lease plate 106) for the bundle of the twenty battery cells Se.

Because the eighteen intermediate lead plates 102 to 105 and 107 to 120 have the same configuration, only the configuration of the lead plate 102 will be described. As shown in FIGS. 6, 9 and 11(A), the lead plate 102 connects between a negative electrode of No. 2 battery cell Se positioned at the bottom stage and a positive electrode of No. 9 battery cell Se positioned at the intermediate stage. The lead plate 102 is configured to enable a voltage signal transmitting therethrough to be inputted into the control circuit that includes circuit portions provided on left and right circuit boards 26 that will be explained later. As shown in FIG. 12(A), the lead plate 102 includes a lead plate body 102m and a band-like signal terminal 102s connected to the circuit portion of the corresponding control circuit board 26 for transmitting the voltage signal.

The signal terminal 102s has a base end portion including a first bent portion 102u and a second bent portion 102v that are bent relative to each other in a stepwise manner. The signal terminal 102s is further bent at a third bent portion 102w positioned on the side of the leading end portion away from the base end portion, so that a portion of the signal terminal 102s extending further from the third bent portion 102w away from the base end portion is positioned substantially at a right angle relative to the lead plate body 102m. The leading end portion of the signal terminal 102s is turned back at a turn-back portion 102x for connecting to the circuit portion of the corresponding control circuit board 26. At the boundary region between the signal terminal 102s and the lead plate body 102m, substantially semicircular cut portions 102 are formed on opposite sides of the base end portion of the signal terminal 102s. Therefore, it is possible to disperse a potential stress that may be applied to the boundary region. In addition, because the signal terminal 102s is bent into a substantially Z-shape by the first, second and third bent portions 102u, 102v and 102w, it is possible to absorb potential impacts or shocks applied to the signal terminal 102s by these bent portions.

In an alternative configuration shown in FIG. 12(B), the signal terminal 102s is bent to have a substantially semi circular arc-shaped configuration instead of the Z-shaped configuration.

The configurations of the positive side lead plate 101 and the negative side base plate 106 are the same with each other. Therefore, only the configuration of the positive side lead plate 101 will be described as a representative. As shown in FIGS. 6, 9 and 11(A), the positive side lead plate 101 is made of electrically conductive material and electrically connects between a positive electrode of No. 1 battery cell Se positioned at the bottom stage and a positive electrode of No. 8 battery cell Se positioned on the intermediate stage. The positive side lead plate 101 further electrically connects the positive electrodes of No. 1 and No. 8 battery cells Se to the positive side cable P.

Figure 13:
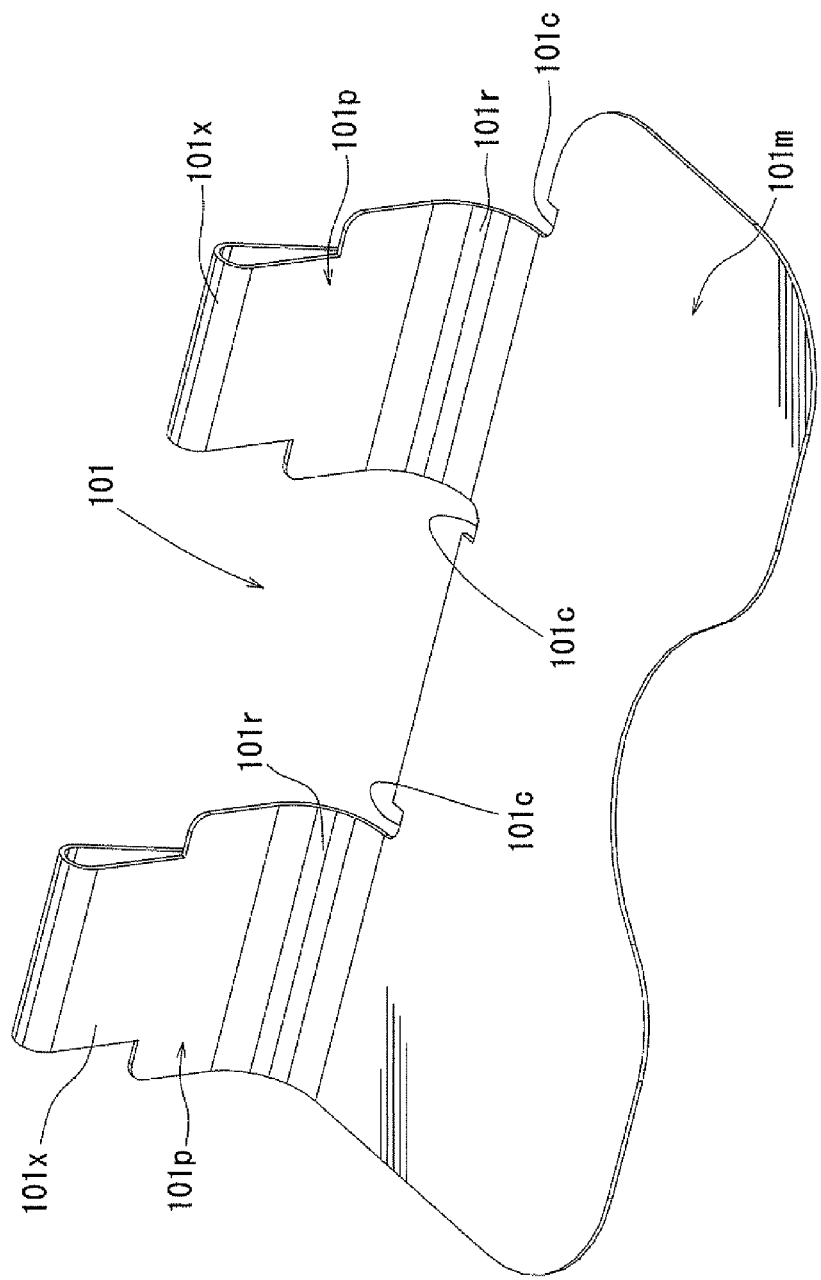

As shown in FIG. 13, the positive side lead plate 101 includes a lead plate body 1011n and a pair of power source terminals 101p. The lead plate body 101m connects between the positive electrodes of No. 1 and No. 8 battery cells Se. Each of the power source terminals 101p can be used for connecting the positive side cable P. By providing two power source terminals 101p in this way, it is possible to reduce the size in width of each power source terminal 101p, so that a soldering operation of the positive side cable P to the positive side lead plate 101 can be easily performed.

The base end portion of each of the power source terminals 101p is formed with an arc-shaped bent portion 101r, so that a portion of the power source terminal 101p extending from the bent portion 101r away from the base end portion is positioned at a substantially right angle relative to the lead plate body 101m. In addition, the leading end portion of each of the power source terminals 101p is turned back at a turn-back portion 101x for connecting to the positive side cable P. At the boundary region between each of the power source terminals 101p and the lead plate body 101m, substantially semicircular cut portions 101c are formed on opposite sides of the base end portion of each of the power source terminals 101p. Therefore, it is possible to disperse a potential stress that may be applied to the boundary regions. In addition, because the base end portion of each of the power source terminals 101p is bent into an arc-shape, it is possible to absorb potential impacts or shocks applied to the power source terminals 101p.

<Insulation Sheets>

As shown in FIG. 6, in the state that the intermediate lead plates 102 to 105 and 107 to 120, the positive side lead plate 101 and the negative side lead plate 106 are positioned to be opposed to the left end surfaces and the right end surfaces of No. 1 to No. 20 battery cells Se, the lead plates 101 to 120 are covered by the insulation sheets 52. The left side insulation sheet 52 is interleaved between the bottom surface of the left holder member 33 and the left end surfaces of No. 1 to No. 20 battery cells Se. The right side insulation sheet 52 is interleaved between the bottom surface of the right holder member 34 and the right end surfaces of No. 1 to No. 20 battery cells Se. The insulation sheets 52 serve to prevent potential shifting movement of the battery cells Se between the left and right holder members 33 and 34 and to prevent potential short-circuiting between the lead plates 101 to 120.

Each of the insulations sheets 52 has openings 52h at positions opposed to the signal terminals 102s and the power source terminals 101p of the lead plates 101 to 120 in order to allow passage of the signal terminals 102s and the power source terminals 101p.

<Holder Members>

Figure 5:
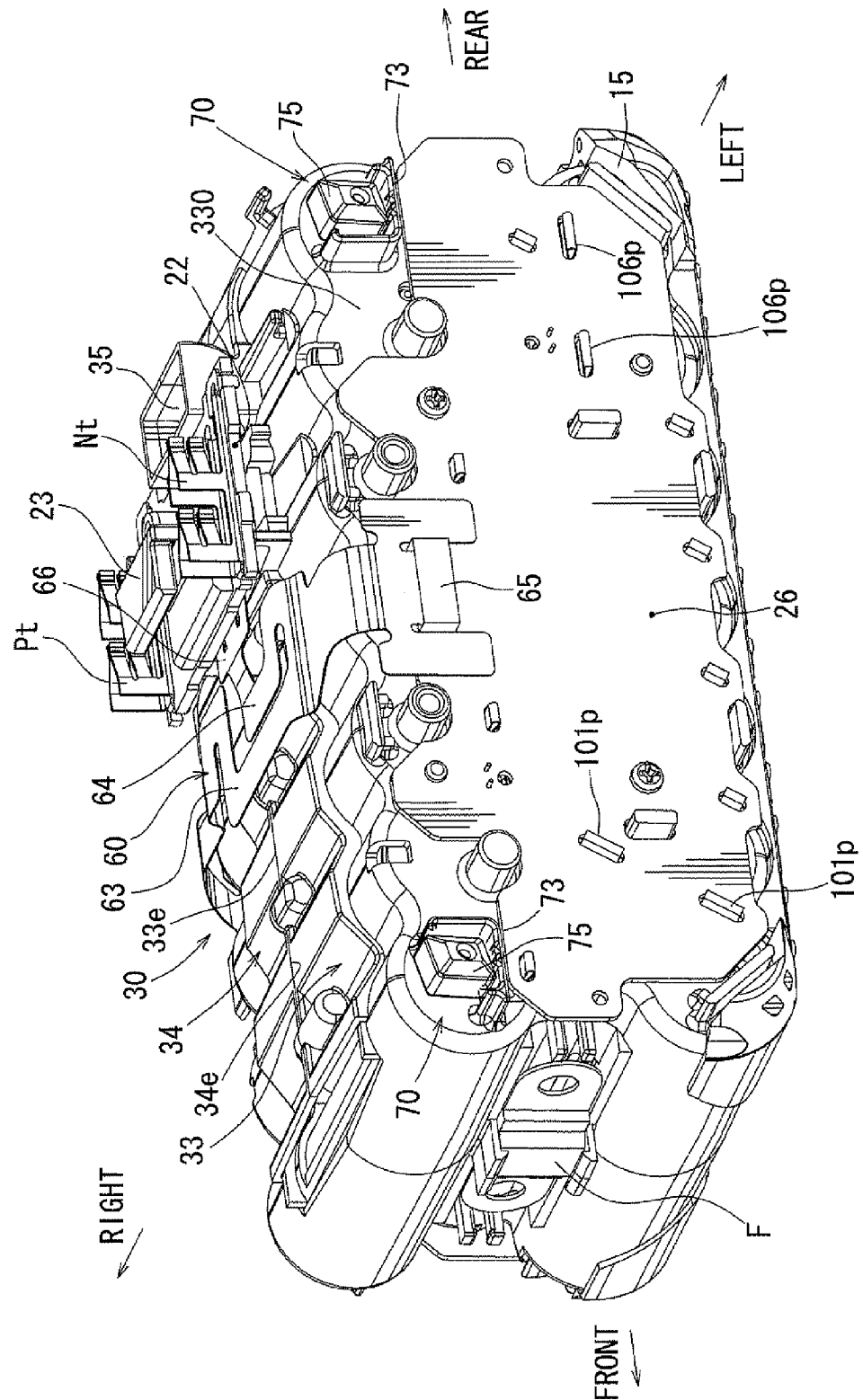
FIG. 5 is a perspective view of the battery cell holder as viewed from the front side.
Figure 7A:
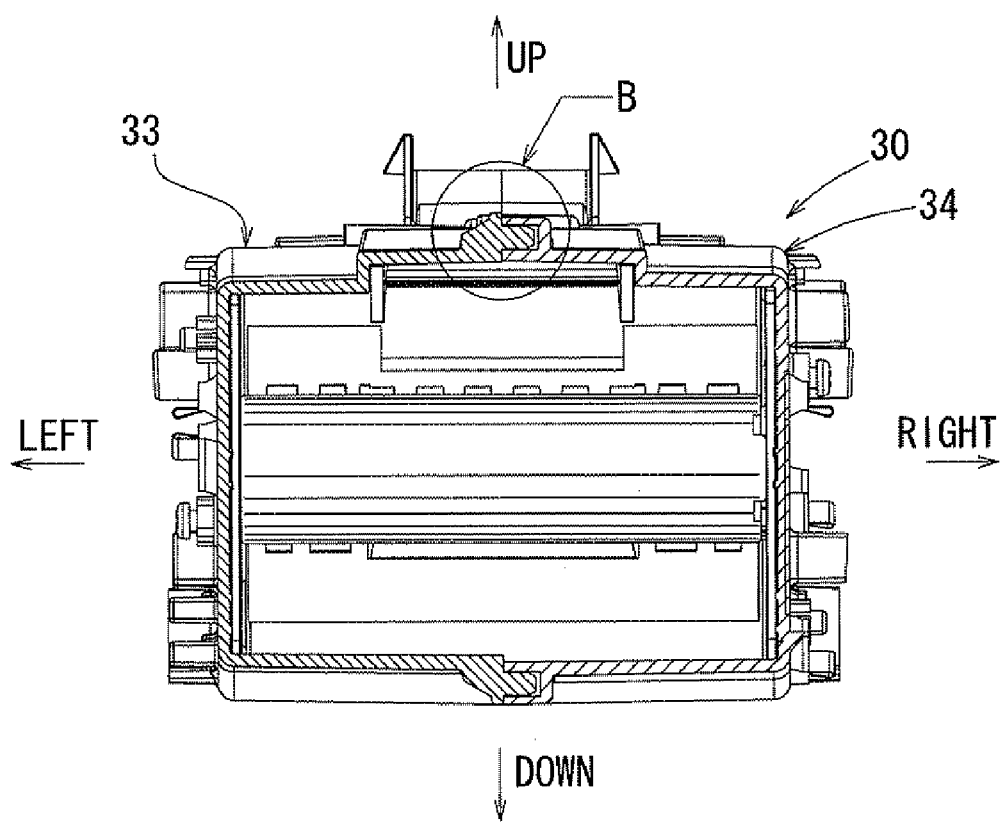
FIG. 7(A) is a vertical sectional view of the battery cell holder.
Figure 7B:
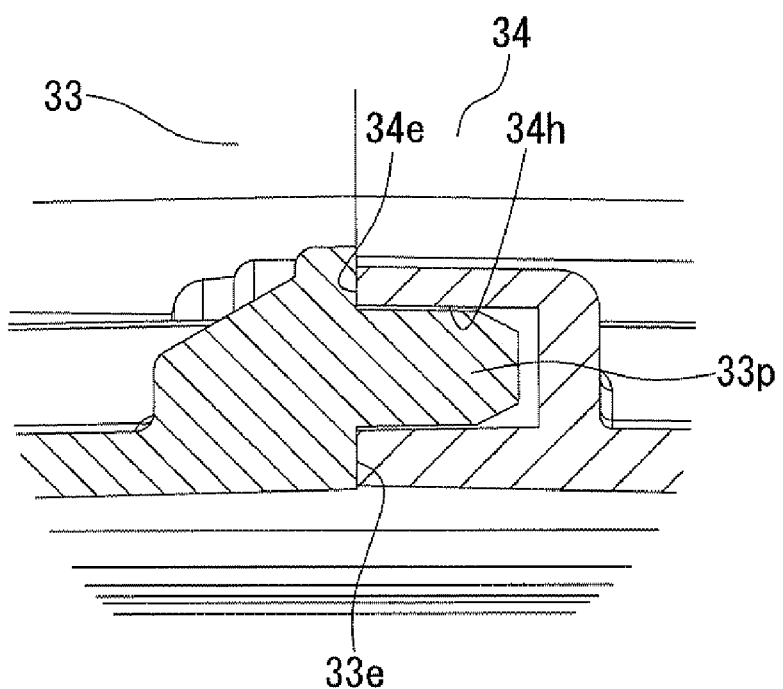
FIG. 7(B) is an enlarged view of a portion indicated by an arrow B in FIG. 7(A)

As shown in FIGS. 3(A) and 5, the left and right holder members 33 and 34 cooperate to constitute a housing of the battery cell holder 30. The left and right holder members 33 and 34 are configured to be substantially symmetrical with each other. As shown in FIG. 7(A), an open edge 33e of the left holder member 33 and an open edge 34e of the right holder member 34 can contact with each other from left and right directions. In this connection, a plurality of positioning projections 33p (one shown in FIG. 7(A)) are formed on the open edge 33e of the left holder member 33 and can be fitted into a plurality of positioning recesses 34h formed in the open edge 34e of the right holder member 34. With this arrangement, it is possible to join the open edge 33e of the left holder member 33 and the open edge 34e of the right holder member 34 to each other always in a predetermined positional relationship. In this way, the left holder member 33 and the right holder member 34 serve as first holder member and a second holder member, respectively, which constitutes the battery cell holder 30.

The left holder member 33 and the right holder member 34 are configured to be symmetrical with each other except for the positioning projections 33p and the positioning recesses 34. Therefore, the details of the left and right holder members 33 and 34 will explained only in connection with the right side holder member 34 as a representative.

Figure 8A:
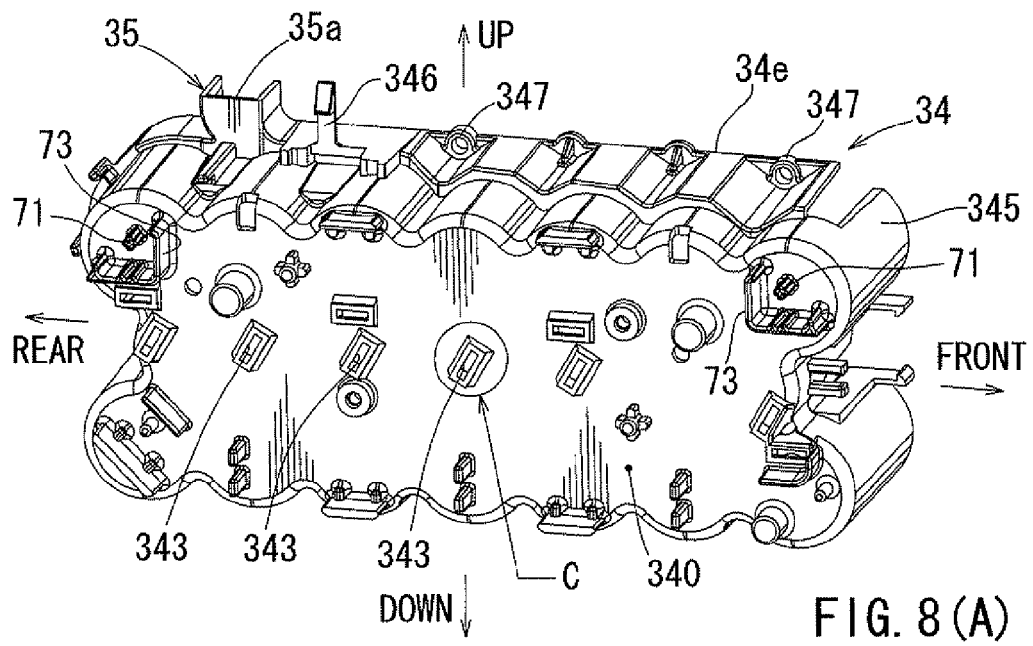
FIG. 8(A) is a perspective view of a right holder member of the battery cell holder as viewed from its outer side.
Figure 8B:
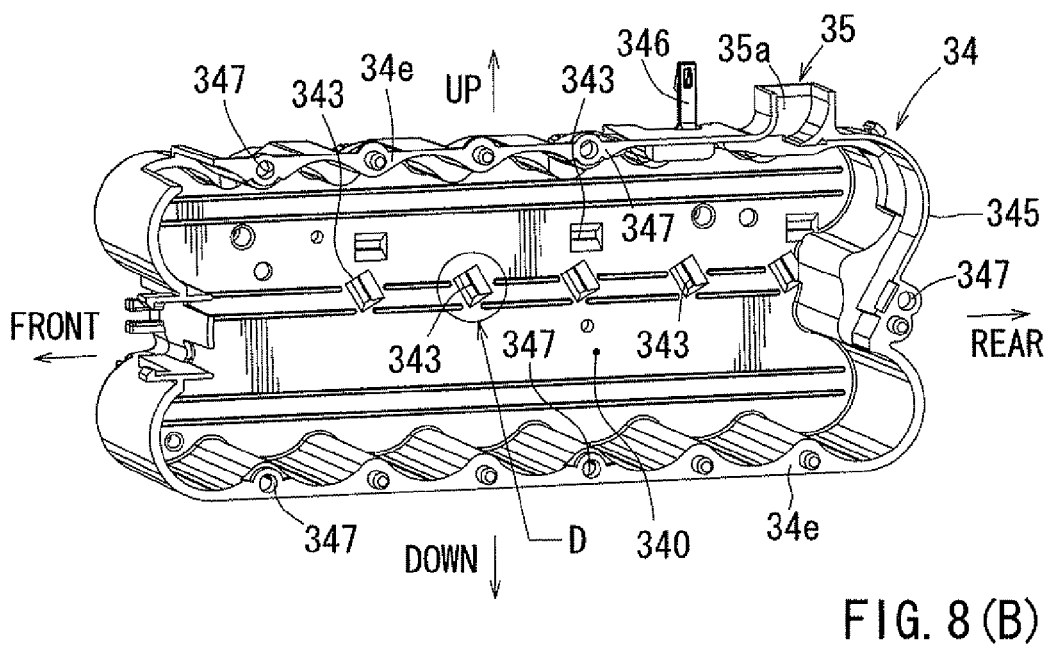
FIG. 8(B) is a perspective view of the right holder member as viewed from its inner side.

As shown in FIG. 6, the right holder member 34 is configured as a case having an open end and a closed end on the opposite side of the open end. The right holder member 34 serves to receive the right half of the bundle of No. 1 to No. 20 battery cells Se held in a three-tiered manner by the flow plate 40. As shown in FIGS. 8(A) and 8(B), the right holder member 34 has a bottom plate 340 and a side plate 345 that is formed to have a waveform to extend along the outer circumferential surfaces of the battery cells Se and the upper surface of the flow plate 40. The side plate 345 has an inlet half portion 35a constituting a right side half of the air inlet 35 and positioned at a rear part of a portion of the side plate 345 defining a left side part of the upper surface of the battery cell holder 30. In addition, and engaging claw portion 346 is provided on the side wall 345 at a position on the front side of the inlet half portion 35a for engaging with an engaging hole 22h (see FIG. 3(A)) formed in the terminal base plate 22, so that the terminal base plate 22 can be held against the battery cell holder 30. In this embodiment, the size of the engaging hole 22h is set to allow the movement of the terminal base plate 22 both in the right and left directions and in the front and rear directions on the condition that the engaging hole 22h is engaged with the engaging claw 346.

Figure 8C:
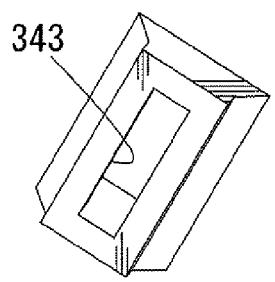
FIG. 8(C) is an enlarged view of a portion indicated by an arrow C in FIG. 8(A)
Figure 8D:
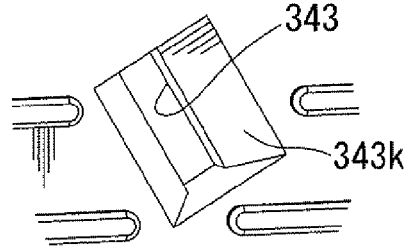
FIG. 8(D) is an enlarged view of a portion indicated by an arrow D in FIG. 8(B)

The bottom plate 340 of the right holder member 34 is configured to be covered by the left insulation sheet 52 and has openings 343 formed at positions corresponding to the openings 52h of the left insulation sheet 52. The openings 343 are configured to allow passage of the signal terminals 102s and the power source terminals 101p of the lead plates 101 to 120 and each has a circumferential edge raised to protrude forwardly from the front surface of the bottom plate 340 by a small distance as shown in FIG. 8(C). On the other hand, the backside of the circumferential edge of each of the openings 343 is depressed from the rear surface of the bottom plate 340 to define a quadrangular prism-shaped recess 343k as shown in FIG. 8(D). Therefore, when the right side half of the bundle of No. 1 to No. 20 battery cells Se is received within the right holder member 34, the signal terminals 102s and the power source terminals 101p of the lead plates 101 to 120 can easily pass through the corresponding openings 343 of the bottom plate 340.

As shown in FIGS. 6, 8(A) and 8(B), tabs 347 having screw insertion holes for insertion of shanks of screws are formed on the open edge 34e of the right holder member 34 at positions corresponding to bottoms of concave portions of the waveform of the side plate 345. The screws can be engaged with threaded holes of screw engaging portions formed on the open edge 33e of the right holder member 33, so that the open edge 34e of the right holder member 34 and the open edge 33e of the left holder member 33 can be joined to each other by using the screws. In this embodiment, the sum of the depths of the right holder member 34 and the left holder member 33 is set to be slightly smaller than the distance between the outer surface (left surface) of the left insulation sheet 52 covering the left end surfaces of the battery cells Se and the outer surface (right surface) of the right insulation sheet 52 covering the right end surfaces of the battery cells Se. Therefore, the left and right insulation sheets 52 are compressed in the thickness direction due to elastic deformation when the open edge 34e of the right holder member 34 and the open edge 33e of the left holder member 33 are joined to each other by tightening the screws after inserting the bundle of the battery cells Se into the right holder member 34 and the left holder member 33. As a result, it is possible to prevent the battery cells Se from moving relative to the left and right holder members 33 and 34.

<Control Circuit Boards>

As shown in FIGS. 1 and 3, right and left control circuit boards 26 of the control device are mounted to the outer surface (right surface) of the bottom plate 340 of the right holder member 34 and the outer surface (left surface) of the bottom plate 330 of the left holder member 33. In other words, the control circuit boards 26 are mounted to right and left sides of the battery cell holder 30. The control circuit serving to control a charge process and/or a discharge process of the battery cells Se based on the voltages of the battery cells Se has a circuit portion provided on the right control circuit board 26 and a circuit portion provided on the left control circuit board 26.

The signal terminals 102s of the intermediate lead plates 102 to 105 and 107 to 110 protruding through the openings 333 of the left holder plate 33 (see FIG. 6) are electrically connected to the left control circuit board 26 (more specifically, the circuit portion of the control circuit attached or mounted to the left control circuit board 26). As shown in FIGS. 4 and 5, the power source terminals 101p of the positive side lead plate 101 and the power source terminals 106p of the negative side lead plate 106 protruding through the openings 333 of the left holder member 33 are inserted into corresponding openings formed in the left control circuit board 26. The positive side cable P is connected to the protruding ends of the power source terminals 101p of the positive side lead plate 101 and the negative side cable N is connected to the protruding ends of the power source terminals 106p of the negative side lead plate 106. The power source terminals 101p and 106p are electrically insulated from the circuit portion of the left control circuit board 26. As shown in FIG. 5, the fuse F is provided in the midway of the positive side cable P and is positioned within a depressed portion formed at the front end surface of the battery cell holder 30.

Signal terminals (corresponding to the signal terminals 102s) of the intermediate lead plates 111 to 120 protruding from the openings 343 of the right holder member 34 (see FIG. 8) are electrically connected to the right side control circuit board 26 (more specifically, the circuit portion of the control circuit attached or mounted to the right side control circuit board 26).

<Flexible Base Plate>

As shown in FIGS. 1 and 3(A), the circuit portions of the left and right control circuit boards 26 are electrically connected to the terminal base plate 22 having the output connector 23 via a flexible base plate 60.

Figure 14:
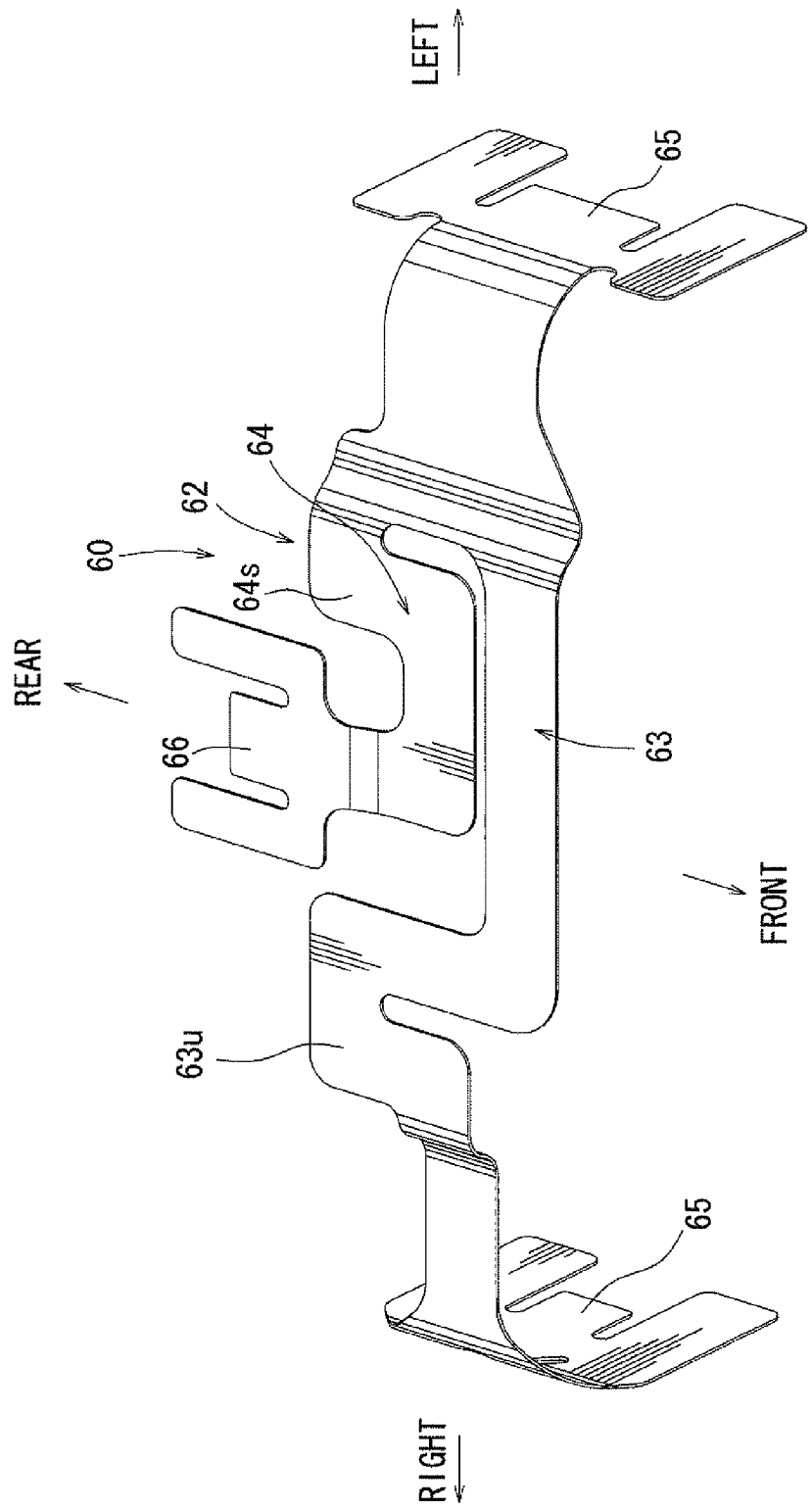
FIG. 14 is a perspective view of a flexible base plate.

As shown in FIGS. 5 and 14, the flexible base plate 60 includes a film-like base plate body 62 and a plurality of signal lines (not shown) embedded within the base plate body 62. The base plate body 62 includes a main base plate portion 63 and a branched base plate portion 64 branched from the main base plate portion 63. The main base plate portion 63 is positioned on the front side of the terminal base plate 22 and extends in right and left directions over the upper surface of the battery cell holder 30. Left and right ends of the main base plate portion 63 are formed with connector portions 65 for connecting to the circuit portions of the left and right circuit boards 26, respectively. A leading end of the branched base plate portion 64 is formed with a central connector portion 66 for connecting to the terminal base plate 22. A substantially U-shaped bent portion 63u is provided at a midway position of the main base plate 63, so that the man base plate portion 63 can extend and contract in the longitudinal direction (left and right directions). In addition, at a midway position of the branched base plate portion 64, a substantially S-shaped bent portion 64s is provided, so that the branched base plate portion 64 can extend and contract in the longitudinal direction (left and right directions).

<Shock Absorbing Mechanism>

Two shock absorbers 70 are provided at upper two corners of each of the control circuit boards 26, so that four shock absorbers 70 are provided at four corners of the battery cell holder 40.

As shown in FIGS. 3(A) and 3(B), each of the shock absorber 70 includes a shaft 71 and an L-shaped wall 73 that are fixedly mounted to the side surface of the corresponding holder member (i.e., the outer surface of the bottom plate 340 of the right holder member 34 or the outer surface of the bottom plate 330 of the left holder member 33). The shaft 71 and the L-shaped wall 73 extend perpendicular to the corresponding control circuit board 26 (corresponding side surface of the battery cell holder 30). The L-shaped wall 73 surrounds the shaft 71 from two different sides. A rectangular shock absorbing block (or a damper block) 75 is mounted to the shaft 71. For example, the shock absorbing block 75 may be made of rubber. As shown in FIG. 3(B), the shock absorbing block 75 has a bearing portion 75j at its central portion, so that the shaft 71 extends through the bearing portion 75j. An outer circumferential surface 75r of the shock absorbing block 75 is configured to be able to contact with a plurality of linear projections 73t formed on the inner side surface of the L-shaped wall 73. Here, the L-shaped wall 73 protrudes outwardly beyond the corresponding control circuit board 26. In addition, an outer end surface 75t of the shock absorbing block 75 protrudes outwardly beyond the L-shaped wall 73 and is tapered toward the outer side.

As shown in FIG. 1, the four shock absorbing blocks 75 positioned at the upper four corners of the battery cell holder 30 are configured such that the end surfaces 75t of these shock absorbing blocks 75 contact the inner side surface of the case body 12 when the battery case 30 is received within the case body 12 as shown in FIG. 1. Thus, the outer side surface of the battery cell holder 30 does not directly contact with the inner side surface of the case body 12. In addition, because the rubber sheet 15 is laid on the inner bottom surface 12b of the case body 12 so as to be interleaved between the lower surface of the battery cell holder 30 and the inner bottom surface 12b of the case body 12, the lower surface of the battery cell holder 30 does not directly contact with the inner bottom surface 12b of the case body 12. In this way, the battery cell holder 30 is received within the case body 12 in a manner floating therewithin by way of the shock absorbers 70 and the rubber sheet 15.

Figure 2A:
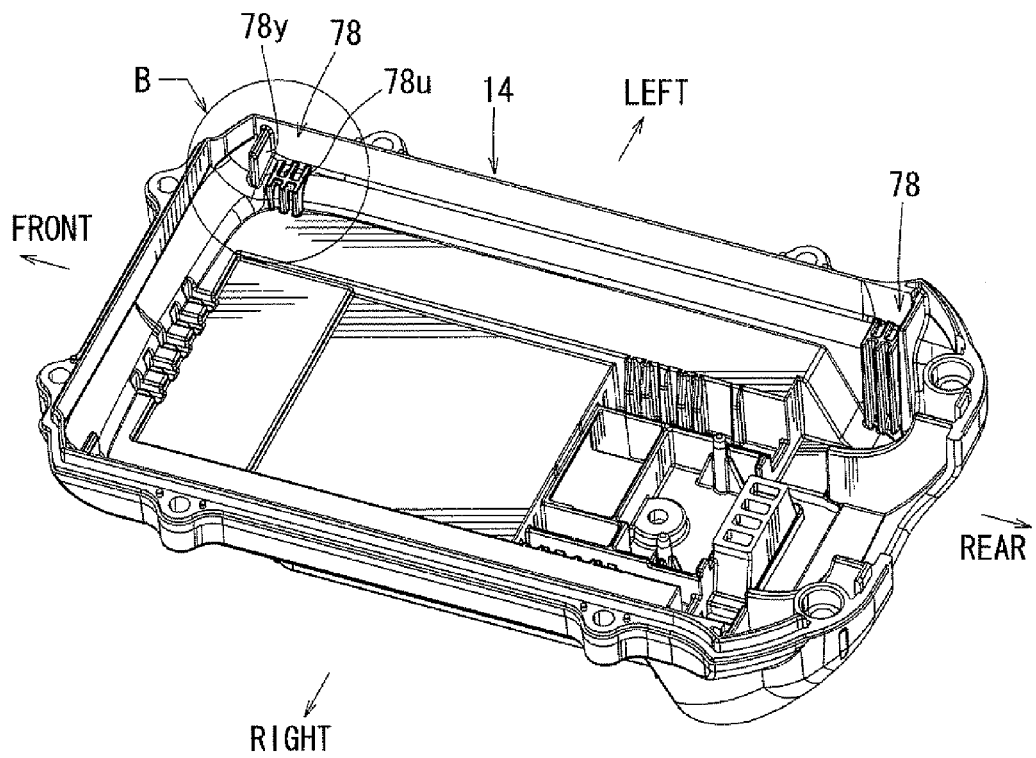
FIG. 2(A) is a perspective view of the cover as viewed from its back side.
Figure 2B:
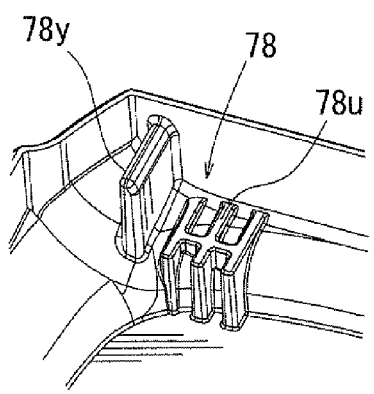
FIG. 2(B) is an enlarged view of a portion indicated by an arrow B in FIG. 2(A)

As shown in FIGS. 2(A) and 2(B), block contacting portions 78 for contacting with the shock absorbing blocks 75 of the shock absorbers 70 are formed at four corners of the inner surface of the cover 14 of the case body 12. Each of the block receiving portions 78 includes an upper contact surface 78u for contacting with the corresponding shock absorbing block 75 and a side contact surface 78y for contacting with the L-shaped wall 73 from the front side direction or the rear side direction. Therefore, when the cover 14 is mounted to and fixed in position relative to the case body 12, the battery cell holder 30 is held in the floating state also by the cover 14. In this way, the shock absorbing blocks 75 serve as a first shock absorbing device disposed on an upper side of the battery cell holder 30 and the rubber sheet 15 serves as a second shock absorbing device disposed on the lower side of the battery cell holder 30.

<Advantages of Battery Pack>

According to the battery pack 10 of this embodiment, the battery cell holder 30 is received inside of the case body 12 with an intervention of the shock absorbers 70 (first shock absorbing device) and the rubber sheet 15 (second shock absorbing device) between the battery cell holder 30 and the case body 12, so that the battery cell holder 30 does not directly contact with the inner surface of the case body 12. Therefore, when impacts or shocks are externally applied to the case body 12 of the battery pack 10, such impacts or shocks may be absorbed by the elastic deformation of the shock absorbers 70 and the rubber plate 15. As a result, it is possible to attenuate or reduce potential impacts applied to the battery cells Se and the battery cell holder 30.

In addition, because the shock absorbers 70 are disposed at four upper corners of the battery cell holder 30, it is possible to efficiently absorb potential impacts by using a minimum number of the absorbers and a minimum volume of materials required for absorbing impacts.

In addition, potential impacts that may be applied to the battery cell holder 30 in the vertical direction can be effectively absorbed by the rubber sheet 15 laid on the inner bottom surface 12b of the case body 12 and supporting the battery cell holder 30 from the lower side.

Further, because the circuit portions of the left and right control circuit boards 26 are connected to the terminal base plate 22 via the flexible base plate 60, it is possible to minimize a wiring space in comparison with a case in which the circuit portions are connected to the terminal base plate 22 via a plurality of cables.

Furthermore, because the flexible base plate 60 can expand and contract in the longitudinal direction, it is possible to reliably prevent potential improper electrical connection of the flexible base plate 60 to the control circuit boards 26 and the terminal base plate 22.

Furthermore, the battery cell holder 30 receives the battery cells Se in a state where the battery cells Se extend horizontally, and the battery cell holder 30 has the left holder member 33 and the right holder member 34 that can be separated and joined to each other in the horizontal direction. Therefore, it is possible to easily position the battery cells Se within the battery cell holder 30.

Furthermore, each of the side plate 345 of the right holder member 34 and a side plate (corresponding to the side plate 345) of the left holder member 33 is formed to have a waveform to extend along the outer circumferential surfaces of the battery cells Se, and the left holder member 33 and the right holder member 34 are joined to each other by screws at tabs 347 positioned to correspond to bottoms of concave portions of the waveforms of the side plate 345 and the side plate of the left holder member 33. Therefore, the screws do not protrude from the circumference of the battery cell holder 30. As a result, it is possible to minimize the size of the battery cell holder 30.

Furthermore, the electrical insulation sheets 52 are positioned between the bottom plate of the left holder 33 and the left end surfaces of the battery cells Se and between the bottom plate of the right holder 34 and the right end surfaces of the battery cells Se. Therefore, it is possible to reliably prevent the battery cells Se from short-circuiting therebetween and it is also possible to prevent potential axial movement of the battery cells Se relative to the battery cell holder 30.

It may be possible to attach an electrical insulating paper to the surface of the insulation sheet 52 in order to improve the insulating performance.

Alternative Embodiments

The present invention may not be limited to the above embodiment but may be modified in various ways. For example, although the battery pack 10 of the above embodiment includes twenty battery cells Se, the number of the battery cells Se may not be limited to twenty and may be suitable determined.

In addition, although the shock absorber 70 is constituted by the shaft 71, the L-shaped wall 73 and the rectangular shock absorbing block 75, the L-shaped wall 73 may be replaced with a wall having a different shape and the rectangular shock absorbing block 75 may be replaced with a shock absorbing block having a different shape.

Furthermore, although the rubber sheet 15 is interleaved between the lower surface of the battery cell holder 30 and the inner bottom surface 12b of the case body 12, the rubber sheet 15 may be replaced with rubber blocks or the like positioned at four lower corners of the battery cell holder 30.

This invention claims:

1. A battery pack comprising:
   a case body;
   a battery cell holder configured to hold a plurality of battery cells;
   terminals including discharge terminals for connecting the battery cells to a power tool or charge terminals for connecting the battery cells to a battery charger;
   a control device capable of controlling a charge process or a discharge process of the battery cells; and
   a shock absorbing device interposed between the battery cell holder and the case body and capable of supporting the battery cell holder and the battery cells not to directly contact with the case body, wherein:
   the battery cell holder is configured to receive the battery cells oriented in a horizontal direction;
   the shock absorbing device comprises a first shock absorbing device including four shock absorbing blocks that are positioned at upper four corners of the battery cell holder, respectively; and the battery cell holder includes a first holder member and a second holder member that can be joined to each other.

2. The battery pack as in claim 1, wherein:
each of the first holder member and the second holder member is configured as a case having a bottom on a first side, an opening defined by an open edge on a second side opposite to the first side, and a side wall;
the open edges of the first and second holder members can contact with each other; the side wall of each of the first and second holder members is shaped to have a waveform with concave and convex portions to substantially conform to the outer circumferential configurations of the battery cells; and
the open edges of the first and second holder members can be joined to each other by fasteners at the concave portions of the side walls.

3. The battery pack as in claim 1 further comprising:
a first electrical insulation sheet having elasticity and interposed between an inner bottom surface of the bottom of the first holder member and first end surfaces of the battery cells; and
a second electrical insulation sheet having elasticity and interposed between an inner bottom surface of the bottom of the second holder member and second end surfaces opposite to the first surfaces of the battery cells.

4. The battery pack as in claim 3 further comprising an electrical insulation paper attached to a surface of each of the first and second electrical insulation sheets.

5. A battery pack comprising:
a case body having an inner surface;
a battery cell holder disposed within the case body and holding a plurality of battery cells therein; and
a support device supporting the battery cell holder within the case body, so that the battery cells and the battery cell holder do not directly contact with the inner surface of the case body, wherein:
the support device comprises a shock absorbing device;
the battery cells extend horizontally within the battery cell holder;
the battery cell holder has a top surface, a bottom surface, a first side surface and a second side surface positioned opposite to the first side surface in a horizontal direction;
the shock absorbing device includes a first shock absorbing device and a second shock absorbing device;
the first shock absorbing device is disposed at the first and second side surfaces of the battery cell holder; and
the second shock absorbing device is disposed at the bottom surface of the battery cell holder.

6. A battery pack comprising:
a case body having an inner surface;
a battery cell holder disposed within the case body and holding a plurality of battery cells therein, the battery cells being oriented horizontally within the battery cell holder;
wherein
the battery cell holder has a top surface, a bottom surface, a first side surface and a second side surface positioned opposite to the first side surface in a horizontal direction;
a support device supporting the battery cell holder within the case body, so that the battery cells and the battery cell holder do not directly contact with the inner surface of the case body;
a control device including a first circuit board and a second circuit board disposed on the first side surface and the second side surface of the battery cell holder, respectively;
a terminal base plate disposed on the upper surface of the battery cell holder and having charge or discharge terminals attached thereto;
a connection base plate electrically connecting between the first circuit board and the terminal base plate and between the second circuit board and the terminal base plate; and
a shock absorbing device disposed between the terminal base plate and the upper surface of the battery cell holder.

7. The battery back as in claim 6, wherein the connection base plate is made of flexible material and is expandable and contractible.

8. A battery pack comprising:
a case body;
a battery cell holder configured to hold a plurality of battery cells;
terminals including discharge terminals for connecting the battery cells to a power tool or charge terminals for connecting the battery cells to a battery charger;
a control device capable of controlling a charge process or a discharge process of the battery cells; and
a shock absorbing device interposed between the battery cell holder and the case body and capable of supporting the battery cell holder and the battery cells not to directly contact with the case body, wherein:
the shock absorbing device comprises a first shock absorbing device including four shock absorbing blocks that are positioned at upper four corners of the battery cell holder, respectively, and
the shock absorbing blocks include bearings, and the battery cell holder includes shafts fitted into the bearings, respectively.

9. A battery pack comprising:
a case body;
a battery cell holder configured to hold a plurality of battery cells;
terminals including discharge terminals for connecting the battery cells to a power tool or charge terminals for connecting the battery cells to a battery charger;
a control device capable of controlling a charge process or a discharge process of the battery cells; and
a shock absorbing device interposed between the battery cell holder and the case body and capable of supporting the battery cell holder and the battery cells not to directly contact with the case body, wherein the shock absorbing device comprises:
a first shock absorbing device including four shock absorbing blocks that are positioned at upper four corners of the battery cell holder, respectively, and
a second shock absorbing device including a shock absorbing sheet that is laid on a bottom of the case body and is capable of supporting at least lower corners of the battery cell holder.

10. A battery pack comprising:
a case body;
a battery cell holder configured to hold a plurality of battery cells;
terminals including discharge terminals for connecting the battery cells to a power tool or charge terminals for connecting the battery cells to a battery charger;
a control device capable of controlling a charge process or a discharge process of the battery cells; and
a shock absorbing device interposed between the battery cell holder and the case body and capable of supporting the battery cell holder and the battery cells not to directly contact with the case body, wherein:

the control device comprises a left control circuit board and a right control circuit board positioned on a left side and a right side of the battery cell holder;

the terminals are provided on a terminal base plate positioned on an upper side of the battery cell holder; and the control circuit boards are electrically connected to the terminal base plate via an electrically conductive flexible plate.

11. The battery pack as in claim 10, wherein the flexible plate is shaped to be able to expand and contract.

12. The battery pack as in claim 10, wherein the terminal base plate is movable relative to the battery cell holder.

13. The battery pack as in claim 12, wherein the shock absorbing device comprises a third shock absorbing device interposed between an upper surface of the battery cell holder and the terminal base plate.

* * * * *